United States Patent [19]

Salesky et al.

[11] Patent Number: 5,201,532
[45] Date of Patent: Apr. 13, 1993

[54] FLEXIBLE NON-PLANAR GRAPHITE SEALING RING

[75] Inventors: William J. Salesky, Irvine; Harold A. Lacquement, Bellflower, both of Calif.

[73] Assignee: Mark Controls Corporation, Long Beach, Calif.

[21] Appl. No.: 806,593

[22] Filed: Dec. 12, 1991

[51] Int. Cl.⁵ .............................................. F16J 15/10
[52] U.S. Cl. .................................. 277/124; 277/102; 277/117; 277/DIG. 6
[58] Field of Search ................ 277/124, DIG. 6, 102, 277/105, 117, 125

[56] References Cited

U.S. PATENT DOCUMENTS

| | | | |
|---|---|---|---|
| 2,765,185 | 10/1956 | Mott | 277/124 |
| 3,069,178 | 12/1962 | Rosen | 277/112 |
| 3,404,061 | 10/1968 | Shane et al. | 277/DIG. 6 |
| 3,773,337 | 11/1973 | Adams | 277/DIG. 6 |
| 4,116,451 | 9/1978 | Nixon et al. | 277/DIG. 6 |
| 4,155,558 | 5/1979 | Nakamura | 277/124 |
| 4,160,551 | 7/1979 | Nixon et al. | 277/DIG. 6 |
| 4,190,257 | 2/1980 | Schnitzler | 277/102 |
| 4,256,317 | 3/1981 | Havens et al. | 277/124 |
| 4,350,346 | 9/1982 | Fowler | 277/DIG. 6 |
| 4,534,922 | 8/1985 | Atkinson et al. | 264/119 |
| 4,591,166 | 5/1986 | Atkinson et al. | 277/1 |
| 4,665,978 | 5/1987 | Luke | 277/DIG. 6 |
| 4,705,278 | 11/1987 | Locacius et al. | 277/235 B |
| 4,789,168 | 12/1988 | Daume | 277/227 |
| 4,792,491 | 12/1988 | Atkinson et al. | 428/408 |
| 4,799,956 | 1/1989 | Vogel | 75/243 |
| 4,826,181 | 5/1989 | Howard | 277/112 |
| 4,892,320 | 1/1990 | Tuckmantel | 277/125 |
| 4,961,991 | 10/1990 | Howard | 428/246 |

OTHER PUBLICATIONS

Brochure, Zoltek, Flexigraf Flexible Graphite, Packing and Gaskets Nov. 1988.
Brochure, Garlock, "Style 9000 EVSP", and attached information entitled EVSP Sets, FCP-5/85-30M, 1985.

Primary Examiner—William A. Cuchlinski, Jr.
Assistant Examiner—D. DePumpo
Attorney, Agent, or Firm—Christie, Parker & Hale

[57] ABSTRACT

A flexible non-planar graphite sealing ring is used to control leakage in a fluid handling device that is caused by a shaft extending through the wall of the device. The flexible graphite sealing ring comprises a chevron-shaped non-planar cross section having approximately complementary inner and outer end faces that are made from laminating sheets of graphite foil in layers transverse to the ring's axis. A plurality of flexible graphite rings are inserted over the shaft and into the stuffing box, occupying the space area between the shaft and the stuffing box. The flexible graphite sealing rings are oriented so that each ring's inner end face adjoins the outer end face of another ring. Upon application of a compressive force, either by internal pressure or by externally applied mechanical loading, the interaction between the dissimilar end faces cause an enhanced interference fit between the shaft and the stuffing box forming a seal.

13 Claims, 3 Drawing Sheets

FLEXIBLE NON-PLANAR GRAPHITE SEALING RING

FIELD OF INVENTION

This invention relates to a non-planar flexible graphite sealing ring used to minimize fluid leakage in a valve stuffing box that occurs between the valve stem and the stuffing box housing.

BACKGROUND OF THE INVENTION

In a fluid handling device, such as a pump or a valve, where a moving stem or shaft extends through a wall of the device, a seal is required at that point to prevent the fluid from leaking from the device. Leakage from such fluid handling devices is undesirable for obvious health, air quality, and safety reasons. For example, a leak of a toxic or flammable fluid could pose a direct threat to human life. Today's heightened environmental consciousness is another influential driving force behind minimizing leaks of toxic or other potentially harmful liquids or gasses onto the ground or into the atmosphere.

Accordingly, such fluid handling devices are often sealed by placing a formed packing material around the shaft, and containing the packing material in the compressed state in a stuffing box. Ideally, the packing material selected should be resilient such that it deforms under compression to conform to the interior of the stuffing box and forms a tight interference seal against the shaft. The packing material should also present a low friction surface to the moving shaft and be stable under the environmental conditions to which it may be exposed. It is also desirable that the packing material act to keep the shaft clean and clear of debris by wiping the surfaces of the shaft as the shaft is passed through the stuffing box. Preferably, the packing is a self energized seal, i.e., that it seals by application of pressure on the seal. It is also desirable that the packing material itself be resistant to fire since many applications are for petrochemical service where fire may be a concern.

Flexible graphite is known in the art and has long been employed as a packing material to form seals for the stuffing box assembly of pumps, valves and like fluid handling devices. Flexible graphite refers to graphite which has been exfoliated and recompressed to a coherent body. The advantages of using graphite as a packing material lies in its excellent thermal stability and chemical resistance. Graphite is also a low friction composition that has commonly been used as a lubricant in certain applications. However, as practiced in the art, flexible graphite has not always proven to be an adequate sealing material due to the lack of resiliency inherent in the particular form used.

One such form of flexible graphite is that of a preshaped ring made by compressing in a closed die a ribbon or tape of graphite that has been wrapped circumferentially in several layers around a shaft. This spiral wrapped form of flexible graphite comprises an anisotropic structure having its bonding planes oriented parallel to the shaft axis. Such flat rings may also be made by laminating exfoliated graphite particles or sheets in a flat sheet and cutting flat gaskets from such a sheet.

The rings are used by stacking several rings over the stem of the fluid handling device such that the rings occupy the annular space between the shaft and the stuffing box housing. A metal collar is then inserted over the stem and is tightened to compress the graphite rings so that the rings deform laterally. An interference fit is formed against the shaft and the interior wall by applying a compressive force to the top of the ring stack.

A shortcoming of this form of flexible graphite lies in its limited resiliency when subjected to an axial compression force. The ends of the ring are flat and they spread laterally only a small amount in response to compression. This lateral spreading is controlled by Poisson's ratio for the material. High compressive forces are required to maintain a good seal. In addition, only the rings near where the force is applied seal due to poor transfer of load between the rings. In one type of valve, a compressive force of about 400 kg/cm$^2$ (5600 psi) may be required to get an interference fit. Even so, traces of leakage may be detected immediately or after limited use.

Flexible graphite seals made from exfoliated graphite have also included braided graphite yarns. Such seals are typically made by wrapping the braided graphite around a shaft. Individual rings may be formed by cutting a helix of braided graphite.

A somewhat self energizing seal is made with a stack of rings, each of which has a wedge shaped transverse cross section. Alternating rings have greater thickness at the inside diameter and outside diameter, respectively. Longitudinal compression on a stack of such rings in a seal tends to wedge alternating rings inwardly and outwardly for sealing against the shaft and stuffing box, respectively.

A self energizing seal which is better than a flat ring has been made of materials such as polytetrafluoroethylene (Teflon). In cross section each side of the ring has a chevron shape. The angles of the chevron are different on the opposite end faces of the ring. When the rings are compressed, the concave side of the chevron is spread laterally by the convex side and the edges of the chevron tightly engage the shaft and stuffing box, forming a tight seal. Teflon forms a good seal, but has temperature limitations and cannot be used above about 260° C.

It would be desirable to form graphite chevron seals, but they have never been made satisfactorily. When such seal rings are formed from circumferentially wound graphite, the planes of weakness extend in the direction of the shaft axis and the rings break apart during the forming operation or when stressed during use.

It is, therefore, highly desirable to provide a flexible graphite packing ring that is sufficiently resilient to allow the degree of deformation necessary to provide a tight interference fit under compression and be strong enough to resist compressive forces. It is also desirable that the flexible graphite packing material be both simple to install and operate.

BRIEF SUMMARY OF INVENTION

There is, therefore, provided in practice of this invention according to a presently preferred embodiment, a flexible non-planar graphite sealing ring capable of sealing a shaft that extends beyond the wall of a fluid handling device and is contained in a stuffing box housing. The sealing ring comprises a non-planer configuration having approximately complementary top and bottom end faces. The cooperation of these end faces, when stacked end-to-end and subjected to a compressive force, causes each ring to expand and force itself against both the shaft and interior wall of the stuffing box.

The flexible non-planar graphite sealing ring has planes of lamination bonding transverse to the shaft axis and the applied compressive force. The graphite sealing ring is made from exfoliated graphite by compressing the graphite particles into sheets of foil, stacking the foil, and then laminating the graphite foil stacks by applying a compression force transverse to the planes of the foil sheets. The flexible graphite sealing ring produced in this manner is better able to accommodate the degree of lateral deformation, under compression, inherent in the ring's non-planar configuration and provide the interference fit needed to form an adequate seal.

DETAILED DESCRIPTION

Figure 1:
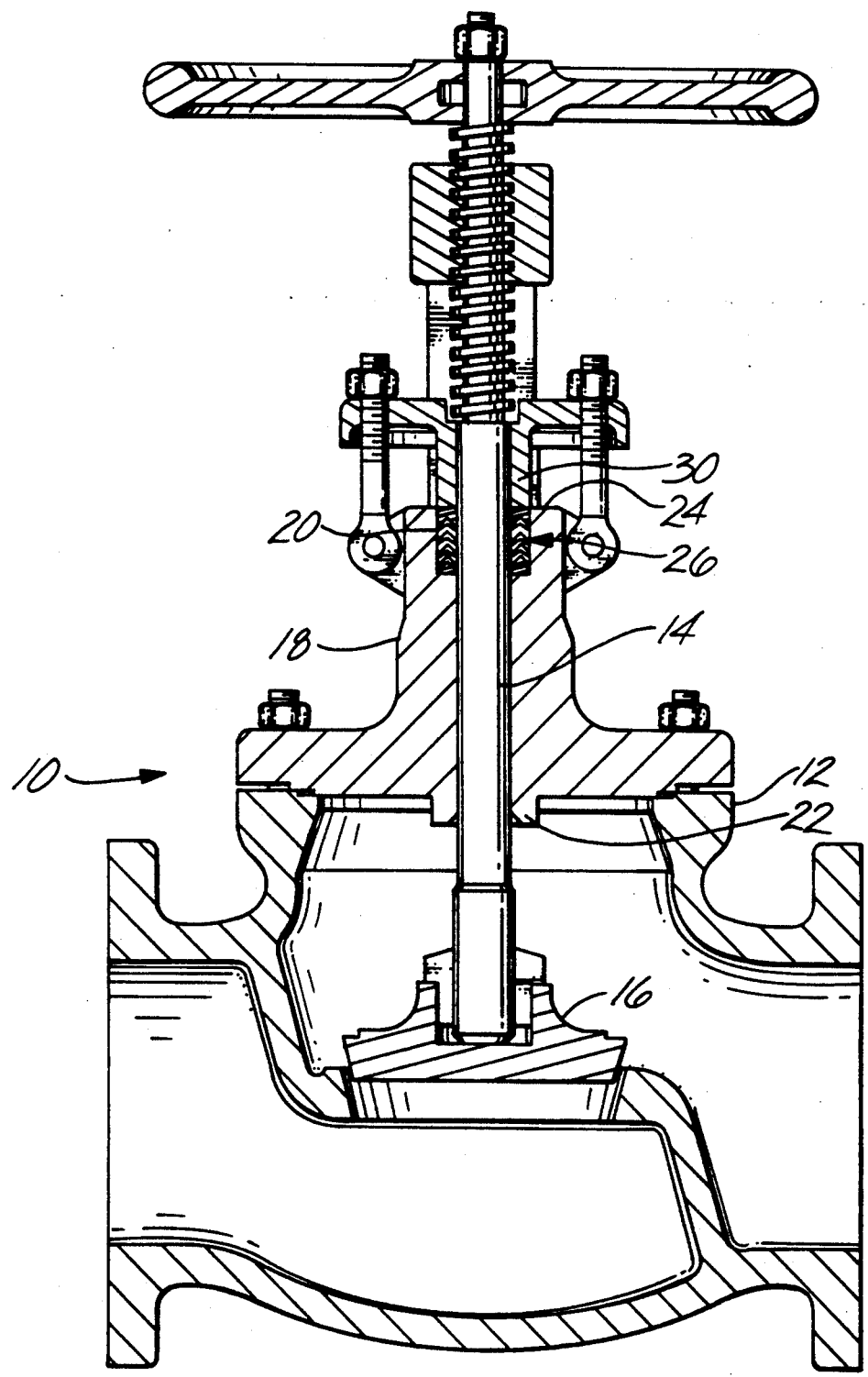
FIG. 1 is a cross section of a valve and the flexible non-planar graphite sealing rings provided in practice of this invention.

In an exemplary embodiment the graphite packing of the present invention is used to minimize leakage in fluid handling devices caused by the insertion of a shaft through the wall of the device and into the fluid. An exemplary fluid handling device is a globe valve 10 as illustrated in FIG. 1. The valve comprises a body 12 having a fluid passage through which the liquid or gas can flow. A shaft or stem 14 extends from outside into the body and is attached to a plug 16 within the valve body which selectively opens or closes the fluid passage through the valve. The shaft exits the body by passing through a bonnet 18 comprising a stuffing box 20.

Figure 2:
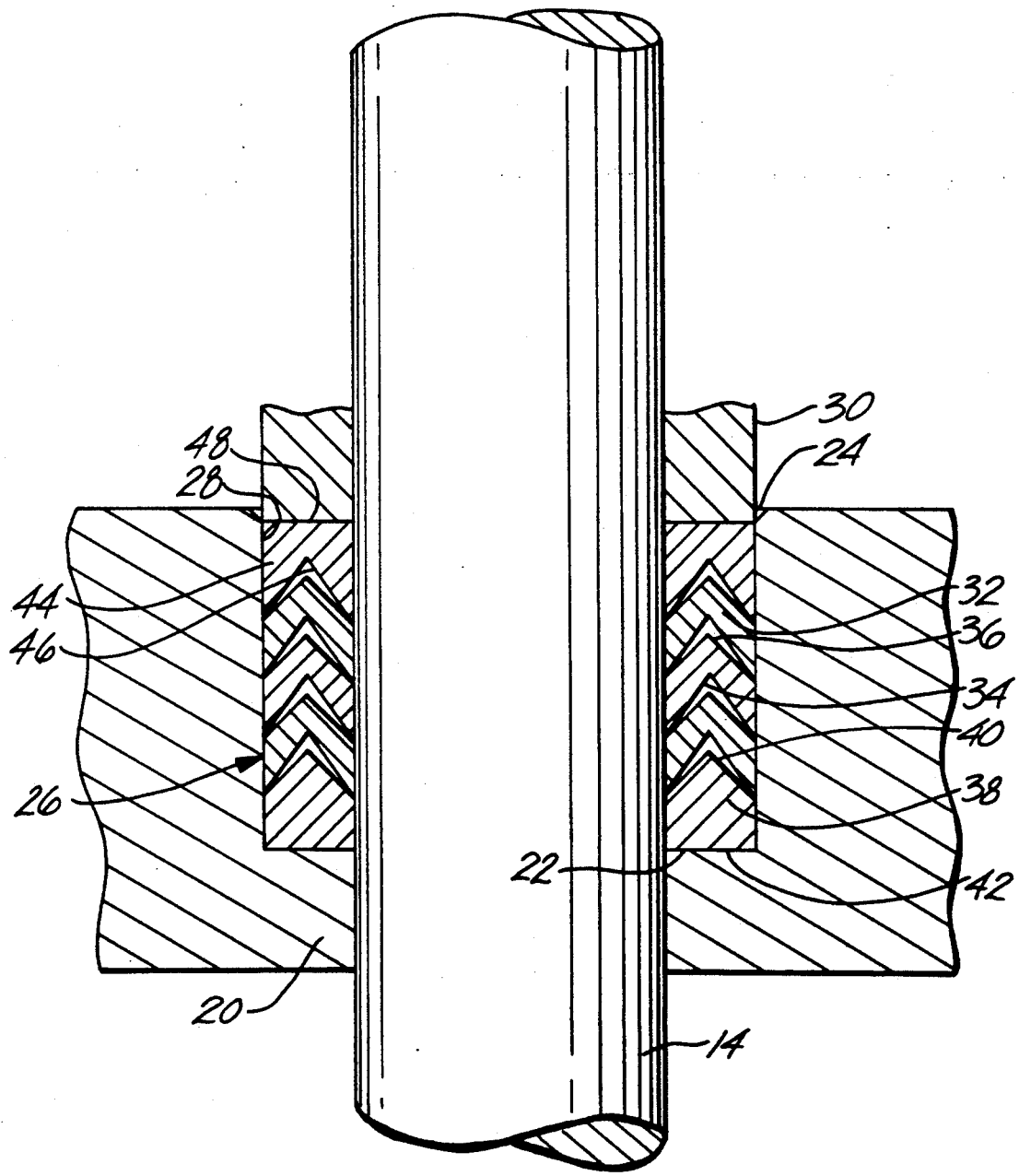
FIG. 2 is a cross section of the stuffing box housing, the shaft and the flexible non-planar graphite sealing rings provided in practice of this invention.

The stuffing box comprises a cylindrical housing having a narrowed inner end 22 near the body and an open outer end 24 at the outer surface (FIG. 2). A plurality of graphite packing rings 26 fit around the shaft and reside between the shaft and the stuffing box's interior wall 28. A packing gland 30 fits on top of the graphite packing rings and serves to apply a compressive force to the packing rings when tightened to the bonnet.

In such a valve the liquid or gas flow being controlled is generally at a pressure significantly greater than atmospheric pressure. Accordingly, since the shaft passes from the body to the atmosphere, leakage occurs at that point where the shaft enters the bonnet. The leakage is controlled though an interference fit achieved by applying a compressive force to the non-planar graphite packing rings contained in the stuffing box.

The illustrated valve is conventional and merely exemplary of a variety of valves in which the novel sealing rings may be employed. Thus, the packing is equally applicable to gate valves, butterfly valves, control valves, or other rising stem or quarter turn valves where a shaft seal is required. Such a packing may also be used in the more dynamic seals of a pump or other rotating machinery or in hydraulic or pneumatic actuators. It is particularly useful for high temperature applications or in the presence of corrosive materials.

In an exemplary embodiment, a flexible graphite packing material used in controlling leakage in fluid handling devices comprises a plurality of non-planar graphite pressure packing rings 32 having a chevron-shaped cross section with approximately complementary inner 34 and outer end faces 36, a graphite bottom packing ring 38 having a cross section with a convex V-shaped outer end face 40 and a planar inner end face 42, and a graphite top packing ring 44 having a cross section with a concave V-shaped inner end face 46 and a planar outer end face 48 as better seen in the larger longitudinal cross section of FIG. 2.

The graphite packing rings of the present invention are made from exfoliated graphite particles. Exfoliated graphite is made by treating graphite flakes with an intercalation agent, typically a mixture of sulfuric and nitric acids, and exposing the treated graphite flakes to an elevated temperature, typically in excess of 1000° C. A typical process for making exfoliated graphite is shown in U.S. Pat No. 3,404,061. These materials and products made from them are available from Polycarbon, Inc., for example.

To make the flexible graphite rings of this invention, the exfoliated graphite particles are compressed into graphite foil sheets having a size at least as large as the diameter of the desired ring. The compressing can be carried out either by passing the exfoliated graphite particles through a series of calender rolls or by compacting the exfoliated graphite in a hydraulic press. Rolling is preferred since it appears to be important to have orientation of the graphite in the plane of the foil as obtained in rolling for good strength. The compression of the graphite serves to reduce the thickness and raise the density of the precompact to the desired graphite foil properties. It is desirable that the resulting graphite foil have thickness in the range of from 0.2 mm to 2.0 mm, while the density of the finished foil is in the range of from 0.5 gm/cm$^3$ to 1.5 gm/cm$^3$.

The graphite foil sheets are stacked in layers and configured into a donut shape by cutting a hole through the middle of the sheets and trimming the outer marginal edge to conform to the size of the ring desired. The configured sheets are then laminated and bonded together by compressing the sheets together in the axial direction of the ring. The graphite sheets are introduced into a closed die mold comprising the particularly desired non-planar shape and compressed in the direction of its axis at a pressure in the range of from 100 kg/cm$^2$ to 550 kg/cm$^2$. It is desired that such a compressive force produce a flexible graphite laminate ring having a density in the range of from 1.2 gm/cm$^3$ to 2.3 gm/cm$^3$. Typically, the compression of the sheets in the final pressing to obtain good bonding between adjacent sheets and raise the total density of the material is about ten to one.

The laminated sheets need not be of uniform thickness through the stack. Thus, for example, it may be desirable to have sheets near the top and bottom which are relatively thinner and intermediate sheets which are relatively thicker. The sheets may also be of different densities through the stack to be laminated. Such variations in thickness and density may provide better formability and properties of the ring.

Each graphite pressure ring produced in this manner comprises a chevron-shaped cross section having a convex circumferential ridge located on the outer end face of the ring, a complementary V-shaped groove located on the ring's inner end face, and cylindrical inside and outside surfaces. The ring's outer end face comprises two cones, one converging and the other diverging, descending from the chevron's apex at an approximately 90 degrees included angle from one another. The ring's inner end face comprises an approximately complementary circumferential V-shaped groove having an included angle of approximately 70 degrees. The dissimilarity between the included angle of the outer and inner end face assures a space between the outer end face of one pressure ring and the inner end face of an adjacent ring upon stacking the pressure rings face to face with each other in the stuffing box.

The top graphite packing ring produced in this manner has a planar outer end face, an inner end face having a circumferential V-shaped groove, and cylindrical inside and outside surfaces. The V-shaped groove has an included angle of approximately 70 degrees and intersects the ring's inside and outside surfaces, being deeper in the middle of the ring cross section.

The graphite bottom packing ring produced in this manner comprises a outer end face having a convex circumferential ridge similar to the ridge around the pressure packing rings, a planar inner end face, and cylindrical inside and outside surfaces. The circumferential ridge has an included angle of approximately 90 degrees. The two end rings of the stack may be formed from die trimmed braided graphite packing material in a similar geometry.

The flexible graphite rings have an inside diameter approximately equal to the diameter of the shaft and an outside diameter approximately equal to the inside diameter of the stuffing box housing. A exemplary embodiment of the flexible non-planar graphite sealing rings has an inside diameter of approximately 3.5 cm, an outside diameter of approximately 6.0 cm, and a height of approximately 1.3 cm.

A graphite ring produced in this manner comprises sheets of an anisotropic graphite structure having planes of lamination bonding transverse to its axis and the axis of the shaft. In a chevron ring, the bonding faces are in chevron shapes themselves, parallel to the end faces of the ring. A structure having planes of bonding transverse to the direction of a compressive force has greater strength preventing longitudinal splitting and is capable of elastic deformation and lateral spreading for forming an interference fit around a shaft and within a stuffing box to form a fluid tight seal.

Non-planar graphite rings made from circumferentailly wound graphite ribbon have their planes of lamination parallel to the shaft axis. Such rings are subject to longitudinal fissure under compression. The spiral rings split longitudinally at the apex of the chevron.

The flexible graphite non-planar sealing rings are used to control leakage in a fluid handling device by first inserting the graphite bottom ring over the shaft and sliding it inside the stuffing box oriented such that the ring's planar inner end face lies flatly against the inner face of the stuffing box and the ring's circumferential convex ridge is directed upwards toward the stuffing box's open outer end. Next, a graphite pressure ring is inserted over the shaft and slid inside the stuffing box oriented such that the V-shaped groove or other non-planar inner end face of the ring is directed downwardly and rests against the bottom ring's outer end face having an approximately complementary circumferential convex ridge.

A plurality of identical graphite pressure rings are then inserted over the shaft and slid inside the stuffing box oriented such that the V-shaped groove of the inner end face of each ring is directed downwardly (inwardly toward the pressure within the packing) and rests against the approximately complementary convex ridge of the outer end face of each adjoining pressure ring. Finally, the graphite top ring is inserted over the shaft and slid inside the stuffing box. The top packing ring is oriented such that its V-shaped interior end face is directed against the approximately complementary convex ridge of outer end face of the last pressure packing ring. The top packing ring's planar outer end face is directed towards the stuffing box's outside open end.

After all of the graphite packing rings are inserted into the stuffing box the packing gland 11 is inserted over the shaft and placed against the planar outer end face of the graphite top packing ring. The packing gland is then bolted to the top of the bonnet 18 and tightened. This tightening draws the packing gland toward the body of the valve and imposes a compressive force upon all of the graphite sealing rings. This compression forces the V-shaped groove of each ring's inner end face against the convex ridge of each adjoining ring's outer end face. Since the convex ridge of each outer end face has an included angle greater than that of the V-shaped groove of each adjoining outer end face the effect of such compression causes the V-shaped groove to flare and expand in a direction transverse to its axis. This expansion forces the pressure ring's inside surface against the fluid device's shaft and forces the pressure ring's outside surface against the interior wall of the stuffing box, thus sealing the device through an interference fit. Accordingly, further tightening of the packing gland increases the compressive force upon the pressure rings which results in a greater interference fit and a better seal. Additionally, due to the geometry of the seal, increases in internal pressure increase the effectiveness of sealing.

Flexible graphite seal rings as described can provide excellent sealing to elevated temperatures, much higher than the 260° C. limit of Teflon. When protected from oxidation, graphite seals may be used to temperatures over 800° C. Even when exposed to oxidation they may be used temperatures near 550° C. The seal is compliant and self energizing under relatively low compressive forces. For example, to obtain sealing with flat graphite sealing rings, pressures of about 400 kg/cm$^2$ are needed to effect a good seal. A pressure of only about 110 kg/cm$^2$ is needed for a very tight seal with a flexible graphite chevron seal as provided in practice of this invention.

This is not a trivial difference. The lower compression stress means that a much smaller valve operating motor or gear is needed as compared with a prior flat seal. The friction on the shaft due to the seal is much smaller, typically about one third as much as with flat seal rings. The valve operator may be as much as one third of the cost of a large valve and cost savings can be significant.

In an exemplary embodiment, only three sealing rings and a pair of mating end rings are used in a valve seal. Larger numbers of seal rings may be used for redundancy. Three rings has been shown to be adequate in a volatile organics fugitive emissions test. In such a test three rings retained methane at a pressure of about 31 kg/cm$^2$ (300 psi) with no detectable leakage. As can be readily realized, such a tight seal is quite significant when toxic materials are being handled. Furthermore, because of its high temperature resistance, such a seal can be relied on to maintain its integrity in fire situations where lower temperature materials might fail.

It might also be noted that the rings may be diagonally split at one side so that they may be placed around a shaft by twisting the ring open rather than placed over the end of the shaft. This is needed at times since it may not be possible to completely disassemble structure from the end of the shaft for replacing the seal rings. Such a split ring may be used since the sealing is at the lip of the chevron and multiple rings in the seal minimize potential leakage paths.

The flexible graphite used for forming the seal rings may not be pure exfoliated graphite. It is sometimes desirable to introduce corrosion inhibitors in the graphite, such as zinc, barium molybdate or various proprietary phosphate inhibitors. Such corrosion inhibitors may be commingled with the graphite particles used for forming the sheets, or may be provided on the surfaces of the completed rings.

Figure 3:
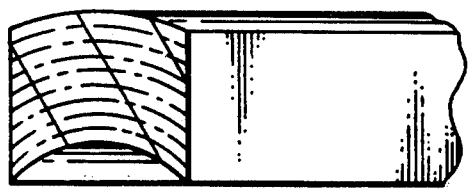
FIG. 3 and 4 are cross sections of alternative non-planar ring configurations.

Although but only one exemplary embodiment of non-planar flexible graphite sealing rings for sealing the shaft of a fluid handling device has been described above, many variations will be apparent to those skilled in the art. For example, FIG. 3 illustrates a flexible graphite sealing ring comprising an alternative non-planer cross section having approximately complementary curved inner and outer end faces. In this embodiment the cross section comprises a convex outer end face having a larger radius than that of the ring's concave inner end face. When subjected to a compression force the interaction of the packing ring's adjoining inner and outer end faces causes an enhanced interference fit, forming a seal in much the same manner as the chevron cross-section of the exemplary embodiment.

Figure 4:
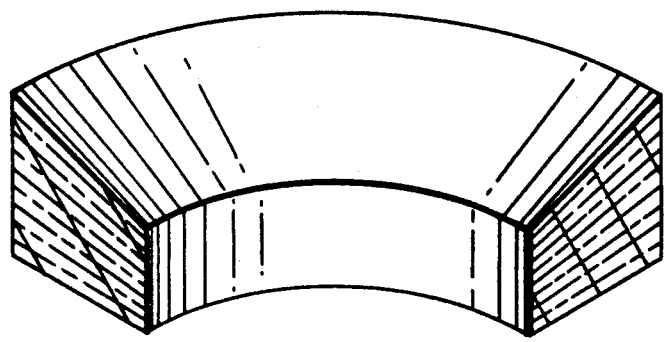

FIG. 4 illustrates a flexible graphite sealing ring comprising an alternative cross section having approximately complementary planar inner and outer end faces. In this embodiment the cross section comprises a conical outer end face that descends from the outside surface towards the inside surface. The conical inner end face descends from the outside surface toward the inside surface in an approximately complementary fashion. The outer end face descends from the outside surface at a greater angle than that of the inner end face. The cross section of the ring is, therefore, somewhat wedge shaped. When subjected to a compression force the interaction between adjoining inner and outer end faces causes the inside surface adjacent to the outer end face to be forced against the shaft and outside surface near the inner end face to be forced against the interior wall of the stuffing box, thus generating an enhanced interference fit and providing the necessary seal. Another pair of rings with opposite wedging action may be used for sealing against the wall of the stuffing box.

Since many such modifications may be made, it is to be understood that within the scope of the following claims, this invention may be practiced otherwise than specifically described.

What is claimed is:

1. A shaft seal comprising:
 a shaft;
 a stuffing box around the shaft;
 a packing between the shaft and stuffing box comprising a graphite ring having at least one non-planar end face; and
 means engaging each face of the ring for biasing at least one edge of the non-planar face of the ring toward the shaft or stuffing box for sealing against the shaft or stuffing box respectively; and wherein the ring is formed substantially entirely of axially compressed exfoliated graphite having bonded faces transverse to the axis of the shaft.

2. A shaft seal as recited in claim 1 wherein the non-planar end face of the ring comprises a concave V-shaped chevron in transverse cross section, and wherein the means for engaging the concave V-shaped face of the ring comprises a convex V-shaped face having an included angle greater than the included angle of the concave chevron face of the ring for biasing the chevron in a spreading direction.

3. A shaft seal as recited in claim 1 wherein the end faces of the ring comprise a chevron in transverse cross section, one end face of the chevron being convex and the other end face being concave, the included angle of the convex chevron being greater than the included angle of the concave chevron.

4. A shaft seal as recited in claim 1 wherein the end faces of the ring each comprise an arc in transverse cross section, one arc being convex and the other concave, the curvature of the convex arc being greater than the curvature of the concave arc.

5. A shaft seal as recited in claim 1 wherein the graphite ring has a density in the range of from 1.2 gm/cm$^3$ to 2.3 gm/cm$^3$.

6. A flexible graphite shaft packing for sealing a shaft extending through the wall of a fluid handling device, the shaft packing comprising a sealing ring made substantially entirely of exfoliated graphite having non-planar end faces and made by pressing and laminating sheets of exfoliated graphite foil having faces of lamination between adjacent sheets of graphite transverse to the shaft axis.

7. A graphite shaft packing as recited in claim 6 wherein the non-planar sealing ring comprises a cross section having approximately complementary curved or toroidal shaped inner and outer end faces.

8. A graphite shaft packing as recited in claim 6 wherein the non-planar sealing ring comprises a chevron shaped cross section having approximately complementary inner and outer end faces.

9. A graphite shaft packing as recited in claim 8 wherein the ring comprises an outer end face having a convex circumferential ridge with an included angle of approximately 90 degrees and a inner end face having an approximately complementary V-shaped circumferential groove with an inside angle of approximately 70 degrees.

10. A graphite shaft packing as recited in claim 9 wherein the graphite ring has a density in the range of from 1.2 gm/cm$^3$ to 2.3 gm/cm$^3$.

11. A flexible graphite shaft packing for sealing the shaft of a fluid handling device, the shaft packing comprising a sealing ring having a chevron-shaped cross section with approximately complementary inner and outer end faces, the sealing ring being made substantial entirely from sheets of laminated graphite foil having planes of lamination between adjacent sheets of graphite extending in a chevron pattern parallel to the end faces of the ring.

12. A valve comprising:
 a valve body including a fluid flow passage through the valve;
 means for closing the fluid flow passage;
 a shaft for actuating the means for closing the fluid flow passage; and
 a seal between the shaft and valve body, the seal comprising:

an annular cavity surrounding the shaft;

a plurality of packing rings in the cavity, each of the packing rings having a concave non-planar end face and a convex non-planar end face, and being formed substantially entirely of axially compressed exfoliated graphite having lamination bonded faces transverse to the axis of the shaft; and means engaging each face of the rings for biasing at least one edge of a concave non-planar face of each ring toward the shaft for sealing against the shaft.

13. A valve as recited in claim 12 wherein each of the packing rings has a chevron cross section with a convex V-shaped end face and a concave V-shaped end face approximately complementary to the convex end face, and wherein the lamination bonded faces of the ring are V-shaped and approximately parallel to the end faces of the ring.

* * * * *